3,211,691
PLASTICIZED COMPOSITIONS COMPRISING POLYMERS OF VINYL CHLORIDE AND A TETRAALKYL ESTER OF CYCLOPENTANE 1,2,3,4-TETRACARBOXYLIC ACID
John Christos Petropoulos, Norwalk, Conn., and Ignazio Salvatore Megna, Somerville, N.J., assignors to American Cyanamid Company, Stamford, Conn., a corporation of Maine
No Drawing. Filed July 31, 1963, Ser. No. 299,102
5 Claims. (Cl. 260—31.8)

The present application is a continuation-in-part of application Serial No. 173,331, filed February 15, 1962 and now abandoned.

This invention relates to a composition of matter comprising a blend of a polymer of vinyl chloride and a tetraalkyl ester of cyclopentane, 1,2,3,4-tetracarboxylic acid, wherein each of said alkyl groups contains from 3 to 12 carbon atoms.

One of the objects of the present invention is to make a composition of matter comprising a polymer of vinyl chloride blended with a tetraalkyl ester of cyclopentane, 1,2,3,4-tetracarboxylic acid, wherein each of said alkyl groups contains from 3 to 12 carbon atoms. A further object of the present invention is to achieve the plasticization of polymers of vinyl chloride by the blending therewith of a tetraalkyl ester of cyclopentane, 1, 2,3,4-tetracarboxylic acid, wherein each of said alkyl groups contains from 3 to 12 carbon atoms. These and other objects of the present invention will be discussed in greater detail hereinbelow.

The cyclopentane, 1,2,3,4-tetracarboxylic acid is a known compound and has been revealed in the literature as well as a number of methods of preparing the same. The carboxylic acid component used in the preparation of the novel alkyl esters of the present invention is cyclopentane, 1,2,3,4-tetracarboxylic acid or the monoanhydride of said acid or the dianhydride of said acid. These tetracarboxylic acids are available in a plurality of configurations. For instance, one may have a cis, cis, trans, cis tetracarboxylic acid or a cis, cis, cis, cis tetracarboxylic acid or a cis, trans, trans, cis tetracarboxylic acid. The configuration of the monoanhydride of the cyclopentanetetracarboxylic acid requires that the adjacent carboxyl groups that have been dehydrated so as to form an anhydride grouping must be cis to one another while the remaining undehydrated carboxyl groups may be either cis or trans to one another or cis or trans to the monoanhydride grouping. In the dianhydride of the cyclopentanetetracarboxylic acid, each of the pairs of carboxyl groups that are dehydrated to form anhydride groupings must be cis to one another although the two anhydride groupings may be either cis or trans to one another. The 1,2,3,4-cyclopentanetetracarboxylic acid (cis, cis, cis, cis) is a colorless, crystalline solid which is not very soluble in most organic solvents and has a melting point of 196° C. and a molecular weight of 246. The 1,2,3,4-cyclopentanetetracarboxylic acid (cis, cis, cis, cis) is prepared in a 60% yield by the nitric acid oxidation of endo-cis-bicyclo[2,2,1],5-heptene-2,3-dicarboxylic anhydride at 60° C. The 1,2,3,4-cyclopentanetetracarboxylic acid-1,2,3,4-dianhydride is a colorless, crystalline solid that is soluble in acetonitrile, ethanol and acetone. This dianhydride has a melting point of 222° C. and a molecular weight of 210. The dianhydride is prepared in quantitative yields from the tetracarboxylic acid using acetic anhydride or acetyl chloride. The preparation of the endo-cis-bicyclo[2,2,1], 5-heptene-2,3-dicarboxylic anhydride is well known in the art and is accomplished by reacting cyclopentadiene with maleic anhydride.

The alkyl esters used in the present invention may be prepared by reacting the tetracarboxylic acids discussed hereinabove with a monohydric saturated aliphatic alcohol containing between 3 and 12 carbon atoms inclusive. Among the monohydric aliphatic alcohols which may be used in the preparation of the products of the present invention are propyl alcohol, isopropyl alcohol, butyl alcohol including the n-butyl, isobutyl and tertiarybutyl alcohol, amyl alcohol, including the n-amyl alcohol, isoamyl alcohol, that is the 2-methyl-butanol-4, the 2-methyl-butanol-3, pentanol-2,2 methylbutanol-2; 2,2,-dimethyl-propanol-1, and the like, the hexyl alcohols, the heptyl alcohols and the octyl alcohols including octanol-1, octanol-2, 2 ethyl-hexyl alcohol, nonyl alcohols, decyl alcohols, undecyl alcohols, dodecyl alcohols and the like.

In carrying out the process for preparing the tetraalkyl esters of the cyclopentanetetracarboxylic acid, it is preferred to make use of an inert organic solvent in which the aliphatic monohydric alcohol and the tetracarboxylic acid are each soluble. Among the inert organic solvents that may be used in the practice of the process of the present invention are benzene, toluene, xylene, mineral spirits, kerosene and the like. It is not imperative that such a solvent be used particularly in those cases where the monohydric aliphatic alcohol is normally liquid and in which the cyclopentanetetracarboxylic acid is soluble. Therein the two reactants only can be heated to produce the tetraalkyl ester. In carrying out the process of the present invention it is necessary to heat the reactants to the esterification temperature with or without an esterification catalyst. More particularly, the reactants should be heated at a temperature between about 75° C. and 220° C. and preferably at about the reflux temperature of the solvent if any present.

In order that the concept of the present invention may be more fully understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE 1

Into a suitable reaction vessel equipped with stirrer, thermometer and condenser with a water trap, there is introduced 492 parts of the 1,2,3,4-cyclopentanetetracarboxylic acid, 1300 parts of 2-ethyl-hexanol and 200 parts of toluene. The reactants are heated until about 142 parts of water are collected in the water trap (about 11 to 13 hours). The excess alcohol and the toluene are then distilled off under vacuum while heating to 200° C. at an absolute pressure of 1.5 mm. of mercury. The crude ester is then distilled under vacuum and displays a boiling point of 273–274° C./0.18 mm./Hg.

*The analysis.*—Calculated for $C_{41}H_{74}O_8$: C, 70.85; H, 10.73. Found: C, 71.29; H, 10.03.

EXAMPLE 2

Into a suitable reaction vessel equipped as in Example 1 there is introduced 73.8 parts of the 1,2,3,4-cyclopentanetetracarboxylic acid, 200 parts of n-butanol, 0.5 part of paratoluene sulfonic acid. Toluene is added to azeotrope off the water of esterification. After 12–15 hours, 21.5 parts of water are evolved. The solution is then cooled to room temperature and diluted with benzene. This solution is then washed with water until neutral and then dried over magnesium sulfate. The evaporation of excess butanol and benzene gives a colorless oil which boils at 206–210° C. at 0.05 mm./Hg.

*The analysis.*—Calculated for $C_{25}H_{42}O_8$: C, 63.80; H, 9.00. Found: C, 63.96; H, 8.64.

EXAMPLE 3

The esters prepared in Examples 1 and 2 are separately incorporated into a commercially available polymer of vinyl chloride and the two are blended together and fluxed on hot mill rolls. The mill temperature is about 150° C. and the mill time is about 10 minutes. After that period the sheet is removed from the roll. Comparable modified polyvinyl chloride compositions are prepared for comparative purposes using such known plasticizers as dioctyl phthalate and dioctyl sebacate. The results obtained on all of these sheets containing 1 part of the plasticizer and 2 parts of the polyvinyl chloride are shown in the following table. It will be observed that the cyclopentanetetracarboxylic acid tetraesters give efficient plasticization of polyvinyl chloride combined with lower volatility and good strength properties. Additionally, it will be noted that the plasticizers of the present invention display low heat loss, low water extraction and low hexane extractables.

Obviously, other additives may be used which are not inconsistent with the plasticizing activity of the diesters, such as dyes and/or pigments, opacifiers, fillers, and the like, may be incorporated into the vinyl resin, along with the plasticizer.

Additionally, it should be noted that according to the present invention half esters of the cyclopentanetetracarboxylic acid may be prepared, which may be used as intermediates in the formation of metallic soaps and the like.

EXAMPLE 4

Example 1 is repeated in substantially all details except in the place of the 2-ethyl-hexanol there is substituted an equivalent amount of n-octyl alcohol. The tetra n-octyl ester is produced.

EXAMPLE 5

Example 4 is repeated in substantially all details except that in the place of the n-octyl alcohol there is substituted an equivalent amount of amyl alcohol. The tetra amyl ester is produced.

Table 1

| Plasticizer | Dioctyl Phthalate | Tetrabutyl CPTA | Tetra-2-ethyl-hexyl CPTA | Dicoctyl Sebaate |
|---|---|---|---|---|
| Source | Naugatude | S5514-17 | S5514-13 | Rohm & Haas. |
| Boiling point, ° C./mm. Hg | 222–230/4.0 | 210/0.10 | 270/0.2 | 240–248/4.0. |
| Tm, ° C., vs. Escambia 3250 | 102–106 | 98–100 | 150–159 | 160–164. |
| Molding Temp., ° C | 130 | 130 | 160 | 170. |
| Tensile Strength, p.s.i | 2,200 | 2,400 | 2,800 | 2,500. |
| Elongation, percent | 160 | 135 | 280 | 340. |
| Rubber Modulus, p.s.i | 1,800 | 1,800 | 2,100 | 1,300. |
| Brittle Pt., ° C.—±10° C | −32 | −24 | −34 | −64. |
| Heat Loss, percent (4 days at 100° C) | 6.9 | 1.9 | 0.3 | 2.2. |
| Water Extractables, percent (24 hr. over boiling water, 24 hr. recovery at 100° C.) | 2.9 | 0.8 | 0.9 | 0.8. |
| Hexane Extractables, percent (2 days in hexane, 16 hr. recovery at 60–65° C.) | 28.6 (cloudy) | 8.6 (clear) | 30.8 (sl. cloudy) | 27.2 (brown). |

The esters used in the present invention may be employed as plasticizers, for the most part, wherever the more conventional dioctyl phthalate esters are employed, and it has been observed that in certain instances, when so employed, heat loss is significantly less than when these conventional dioctyl phthalates are employed. Additionally, the esters of the present invention display certain well defined advantages over polymer type of plasticizers particularly in the areas of low heat loss and extractables with hexane coupled with good low temperature properties. The alkyl esters of the present invention are not limited to the homoalkyl esters but encompass mixed alkyl esters where one saturated aliphatic monohydric alcohol is utilized to esterify at least one but not more than three of the carboxyl groups in the cyclopentanetetracarboxylic acid while a different saturated aliphatic monohydric alcohol is utilized to esterify the remaining carboxyl groups. Illustrative of these mixed esters are the dibutyl, dioctyl ester of the 1,2,3,4-cyclopentanetetracarboxylic acid, the monoamyl trilauryl ester of the 1,2,3,4-cyclopentanetetracarboxylic acid and the like.

In plasticizing the homopolymers of vinyl chloride, polyvinylidene chloride or copolymers of vinyl chloride and/or polyvinylidene chloride, vinyl acetate, cellulose acetate, cellulose butyrate and the like, the amount of alkyl ester of the cyclopentanetetracarboxylic acid which may be used can be varied over substantial limits, depending upon the degree of plasticizing desired. As the amount of ester is increased, the greater the plasticity of the resulting sheet. For example, between 5 and 200 parts of these dialkyl esters per 100 parts of vinyl resin may be employed. For most applications, a somewhat narrower range of the order of between about 50 and 150 parts of these dialkyl esters per 100 parts of polymer may be employed.

We claim:
1. A composition of matter comprising a major portion of a blend of a polymer of vinyl chloride and a tetraalkyl ester of cyclopentane, 1,2,3,4-tetracarboxylic acid, wherein said alkyl groups contain from 3 to 12 carbon atoms and there are 5 to 200 parts of tetraalkyl ester per 100 parts of vinyl resin.

2. A composition of matter comprising a major portion of a blend of a polymer of vinyl chloride and a tetrabutyl ester of cyclopentane, 1,2,3,4-tetracarboxylic acid wherein there are 5 to 200 parts of tetrabutyl ester per 100 parts of vinyl resin.

3. A composition of matter comprising a major portion of a blend of a polymer of vinyl chloride and a tetra n-octyl ester of cyclopentane, 1,2,3,4-tetracarboxylic acid wherein there are 5 to 200 parts of tetraoctyl ester per 100 parts of vinyl resin.

4. A composition of matter comprising a major portion of a blend of a polymer of vinyl chloride and a tetra 2-ethyl-hexyl ester of cyclopentane, 1,2,3,4-tetracarboxylic acid wherein there are 5 to 200 parts of tetraethylhexyl ester per 100 parts of vinyl resin.

5. A composition of matter comprising a major portion of a blend of a polymer of vinyl chloride and a tetraamyl ester of cyclopentane, 1,2,3,4-tetracarboxylic acid wherein there are 5 to 200 parts of tetraamyl ester per 100 parts of vinyl resin.

References Cited by the Examiner

UNITED STATES PATENTS 3,023,233  2/62  Maggiolo et al. _____ 260—31.8
3,074,997  1/63  Lynn et al. _____ 260—468

MORRIS LIEBMAN, *Primary Examiner.*